United States Patent [19]

Ruhnau et al.

[11] 4,125,295

[45] Nov. 14, 1978

[54] DIGITAL SPEED DETECTING CIRCUIT FOR A ROTATING MEMBER HAVING A WIDE SPEED RANGE

[75] Inventors: Gerhard Ruhnau; Wolfgang Gudat, both of Hanover, Fed. Rep. of Germany

[73] Assignee: WABCO Westinghouse GmbH, Hanover, Germany

[21] Appl. No.: 819,312

[22] Filed: Jul. 27, 1977

[30] Foreign Application Priority Data

Aug. 4, 1976 [DE] Fed. Rep. of Germany ....... 2635004

[51] Int. Cl.$^2$ .............................................. B60T 8/02
[52] U.S. Cl. ................................. 303/95; 180/105 E; 235/92 TF; 324/166; 340/671; 361/238; 361/239; 364/426; 364/565
[58] Field of Search ................. 180/105 E; 188/181 R, 188/181 C; 235/92 FQ, 92 TF, 150.2, 151.32; 246/182 B, 182 C; 303/20, 91, 95, 106, 109; 324/78 D, 115, 161, 166, 173; 328/129, 140, 152, 154, 155; 340/53, 263; 361/238, 239, 242; 364/426, 565

[56] References Cited

U.S. PATENT DOCUMENTS

| 3,525,044 | 8/1970 | Richmond | 235/92 TF X |
|---|---|---|---|
| 3,602,994 | 9/1971 | Layman | 328/155 X |
| 3,657,658 | 4/1972 | Kubo | 328/140 X |
| 3,745,475 | 7/1973 | Turner | 328/129 X |
| 3,917,927 | 11/1975 | Minton | 235/92 TF |

Primary Examiner—Stephen G. Kunin
Attorney, Agent, or Firm—R. W. McIntire, Jr.

[57] ABSTRACT

A digital speed detecting circuit of the type in which pulses of a clock frequency are counted during a time interval of a cycle of the sinusoidal signal obtained from a sensor of the rotating member whose speed is being measured. The pulse count throughout the speed range of the rotating member is adjusted to be within a range best suited for accurate evaluation, since the pulse count exceeds this range at high and low speeds. This is accomplished in a first embodiment by shifting to a different counting frequency in different speed ranges and correcting the speed signal obtained by a factor corresponding to the degree of frequency change. In a second embodiment, the counting frequency is monitored and adjusted each cycle of the sinusoidal signal by comparing in a shift register the stage of advancement of a binary counter that produces the pulse count with a reference stage establishing the upper limit of the evaluation range. The frequency adjustment required each cycle depends upon the speed range of the rotating member and is monitored to provide a correction factor by which the speed signal is adjusted in accordance with the time required to shift the most significant bit of the shift register signal to the reference stage. In the third embodiment, the time interval of the sinusoidal sensor signal is increased in binary steps associated with different speed ranges of the rotating member so that the pulse count is registered during each speed range for various durations.

7 Claims, 5 Drawing Figures

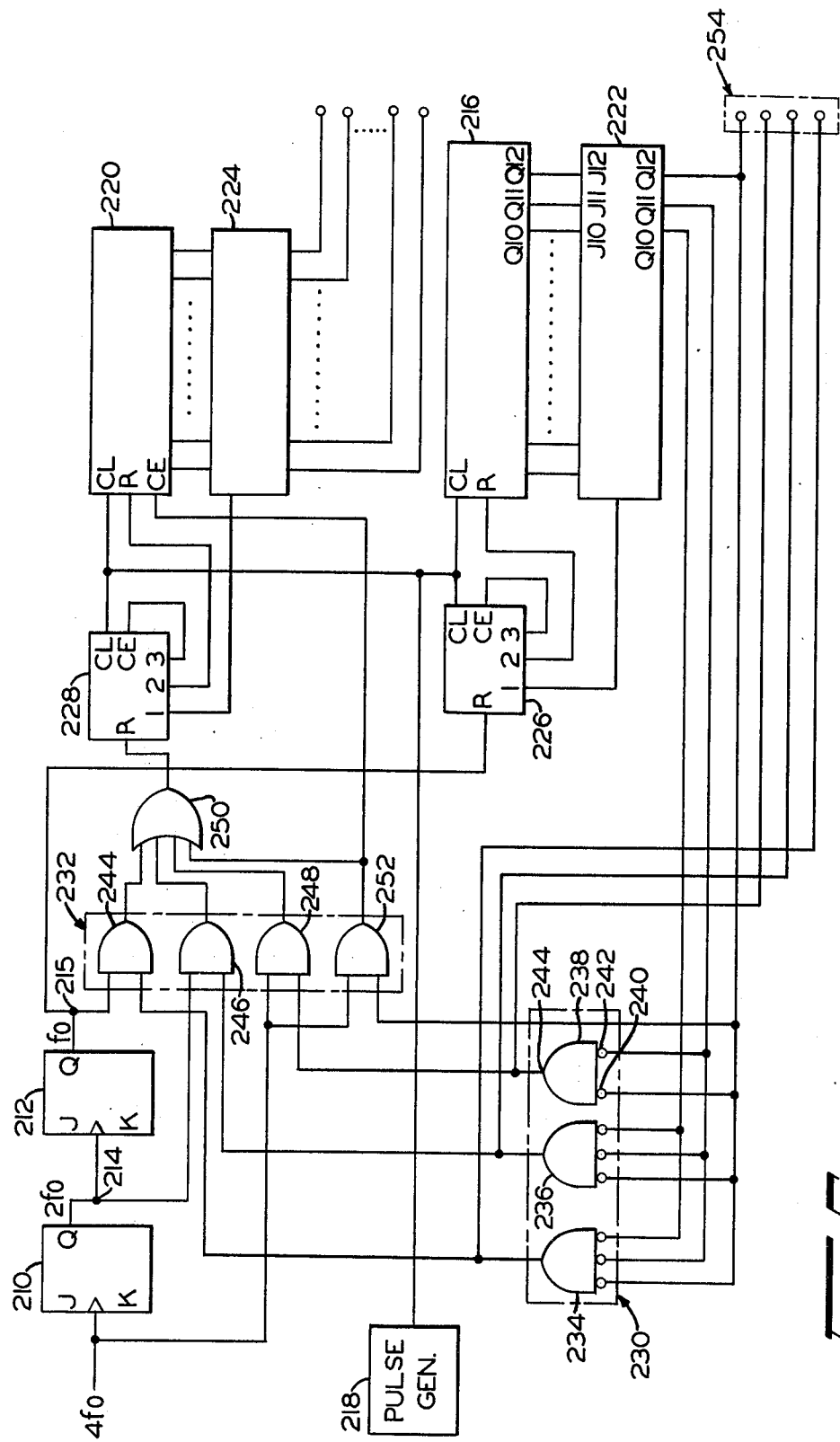

DIGITAL SPEED DETECTING CIRCUIT FOR A ROTATING MEMBER HAVING A WIDE SPEED RANGE

BACKGROUND OF THE INVENTION

The invention is concerned with a device for the digital measurement of the rotational speed of a rotating member, for example of a vehicle wheel, in particular for antiskid control systems, having a sensor which produces a sequence of signals proportional to the rotational speed, and having a measurement device, which is provided with a counter and a pulse generator, for counting the counting pulses of a certain frequency which are supplied by the pulse generator and which fall within the duration of a cycle or of a time interval which is dependent upon the cycle duration.

In systems employing digital measurement by means of sensing a rotating wheel with a sensor and the measurement of the cycle duration of the sensor signal by counting high-frequency pulses falling within the duration of the sensor signal cycle, essentially two related problems occur:

1. If not too high a counting rate is chosen, there occur great errors in quantization in the upper speed range, as determined by the relatively large time range of the cycle duration assigned to one pulse of the pulse train, i.e. by a relatively large quantization unit.

2. If the counting rate is increased in order to keep the error in quantization in the upper speed range small, then very high counting results are obtained in the lower speed range, which requires the use of multi-digit counters and means a substantial increase in the data word length, thus causing a very considerable increase in circuit-related and component-related expenditures, in particular with regard to the evaluation.

Consequently, it has been already suggested to not only limit — in the direction of higher speeds — the respective measuring time to the duration of a cycle of the sensor signal but to have several cycles fall within the measuring time and to subsequently correct the counting result accordingly. It is a disadvantage that this measure does not allow the error in quantization to be reduced. There is obtained merely a mean value from several cycles. Speed changes which occur during the relatively long measuring time cannot be detected, so that the sensitivity of such an arrangement is low, at least in the upper speed range, which is particularly important for the brake power regulation.

SUMMARY OF THE INVENTION

Accordingly, the object of the present invention is to provide a system of the type indicated at the beginning which avoids the disadvantages of the known arragnement and whereby the error in quantization in the upper speed range can be kept small, with relatively minimal component-related expenditures.

The aforementioned object of the present invention is attained in that the counting device is connected with a comparison device for comparing the measured number of counting pulses of a certain measurement frequency or of a quantity derived from this counting pulse number with specified preset counting limits for a given established evaluation range, the latter comparison device being connected with a device for transforming the measured number of counting pulses so as to fall within the evaluation range when one of the counting limits is exceeded or not reached. The circuit of the device of the invention can be manufactured at relatively low cost. In particular for transformations carried out in binary stages, simple digital circuits such as counters with decoding outputs and shift registers, can be used for the control of the counting and transforming processes.

According to one form of the invention the transformation takes place — when the preset counting limits are exceeded or not reached — by changing the frequency of the counting pulses in such a manner that the number of counting pulses measured fall within the preset counting limits, in which case the measurements can be started with a specified lower frequency, with a specified higher frequency or any frequency taken from several different frequencies associated with a certain predetermined speed range.

In each case, comparing the counting results with preset counting limits or comparing the corresponding speed values with preset speed ranges ensures a change in the measurement frequency, in such a manner that the most favorable measuring range is obtained, which means that under the preset conditions the processing takes place each time with the widest possible counting range. Thus, the error in quantization is reduced at high speeds without having to increase the data word length, i.e. the counting range.

In order to obtain — when the measurement frequency changes — the right speed from the number of counting pulses measured, a correction is required which can be carried out in a particularly simple manner when the changes in the measurement frequency are carried out — in accordance with further forms of the invention — in a stepwise manner, that is, in binary stages. Both the change in the measurement frequency and the subsequent correction of the speed values ascertained can then be effected simply by shifting in a shift register or by dividing.

According to another form of the invention, the transformation takes place by reducing, when exceeding the preset counting range for the evaluation, the number of counting pulses measured by a value which corresponds to the ratio of counting pulse number to maximum number of the present counting range. This reduction is carried out ideally in a stepwise manner and preferably in binary stages, in order to obtain the corresponding digital information units and to terminate the transformation when the correct speed is found to be present. With this method, the processing is initiated at the outset from a higher measurement frequency which, is also suitable for high speeds and, when exceeding the maximum count as preset, a simple measuring-range widening is obtained by dividing the counting result, and the error in quantization can be easily kept within the limits desired.

According to another advantageous form of the invention the transformation takes place in that — as a function of the cycle or partial cycle duration as determined during each immediately preceding measurement — the measuring time for the immediately following measurement is chosen to be equal to this cycle or partial cycle duration or chosen to be of a duration which is shorter or longer than this cycle or partial cycle duration.

BRIEF DESCRIPTION OF THE DRAWINGS

The invention will now be further explained with reference to the accompanying drawings in which:

FIGS. 4 and 5 show block diagram of alternate embodiments of the present invention.

DESCRIPTION AND OPERATION

Figure 1:
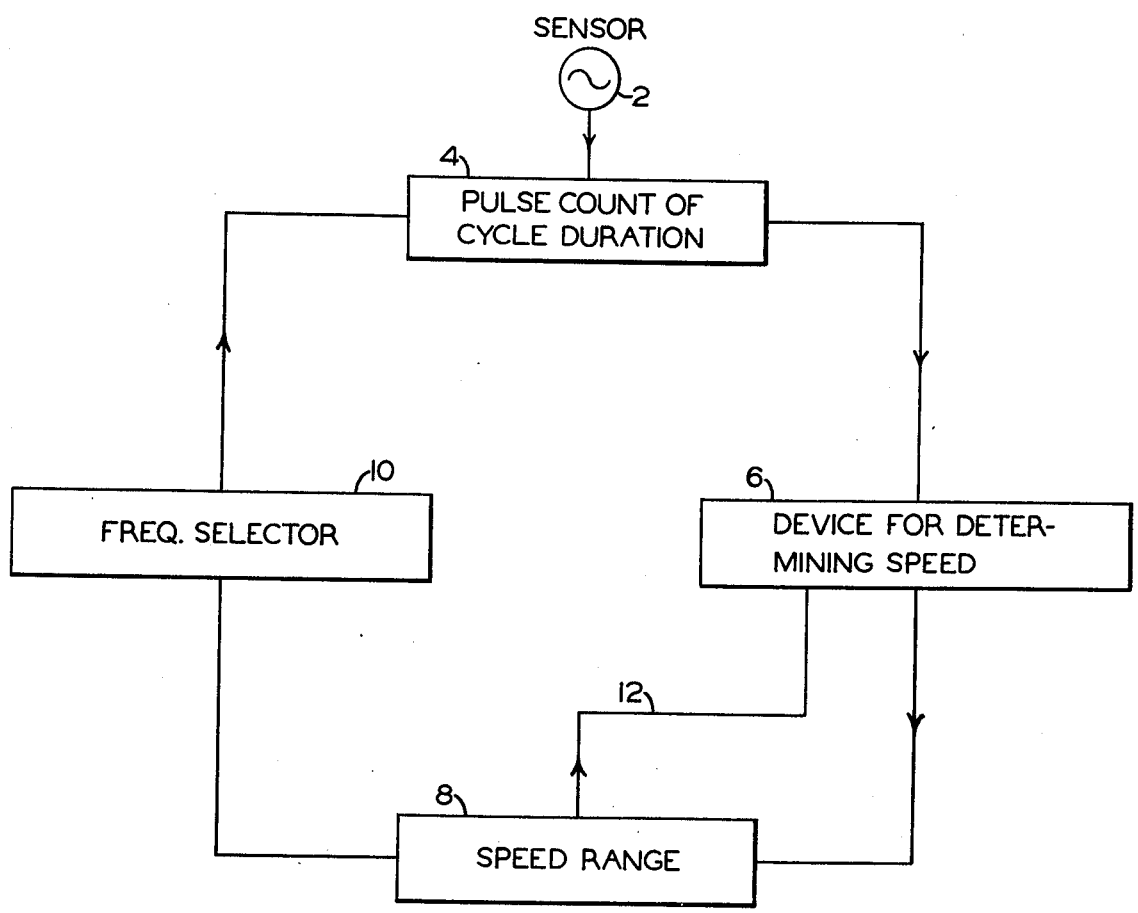
FIG. 1 shows a basic block diagram of the arrangement of the present invention.

FIG. 1 shows a block diagram of a circuit arrangement according to the invention with which, within the speed range provided, the cycle duration or pulse count frequency is changed in a stepwise manner as a function of the speed. The sinusoidal signals produced by a sensor 2, such as a conventional magnetic pick-up device, are transmitted, after conversion into corresponding square wave signals in a sine-square wave converter (not shown), to a device 4 for determining the cycle duration of the sensor signal. Device 4 may be provided, for example, with a counter which counts the number of counting pulses provided by a pulse generator falling within one cycle duration of the sensor signal.

The measured value in terms of a pulse count corresponding to the cycle duration is transmitted to a device 6 for determining the speed of a rotating member with which sensor 2 is associated. An electrical quantity corresponding to the speed, as computed, is transmitted to a device 8 for determining the speed range in which the rotating member is operating. It is for instance possible to subdivide a preset speed range of 0–150 km/h into four subranges, each being assigned to a certain frequency which ensures a measurement of the cycle duration of the sensor signals with the smallest possible error.

After having ascertained the speed range, the measurement frequency supplied to the counter of the device 4 for determining the cycle duration in terms of a pulse count is shifted in a device 10 to the proper frequency. The device 8 for determining the speed range is, in addition, connected via a correcting line 12 with the device 6, so that the measured speed does not reflect the frequency change. Via this correcting line, the value necessary for correcting the measured speed found in accordance with the changed frequency is transmitted to the device 6.

Figure 2:
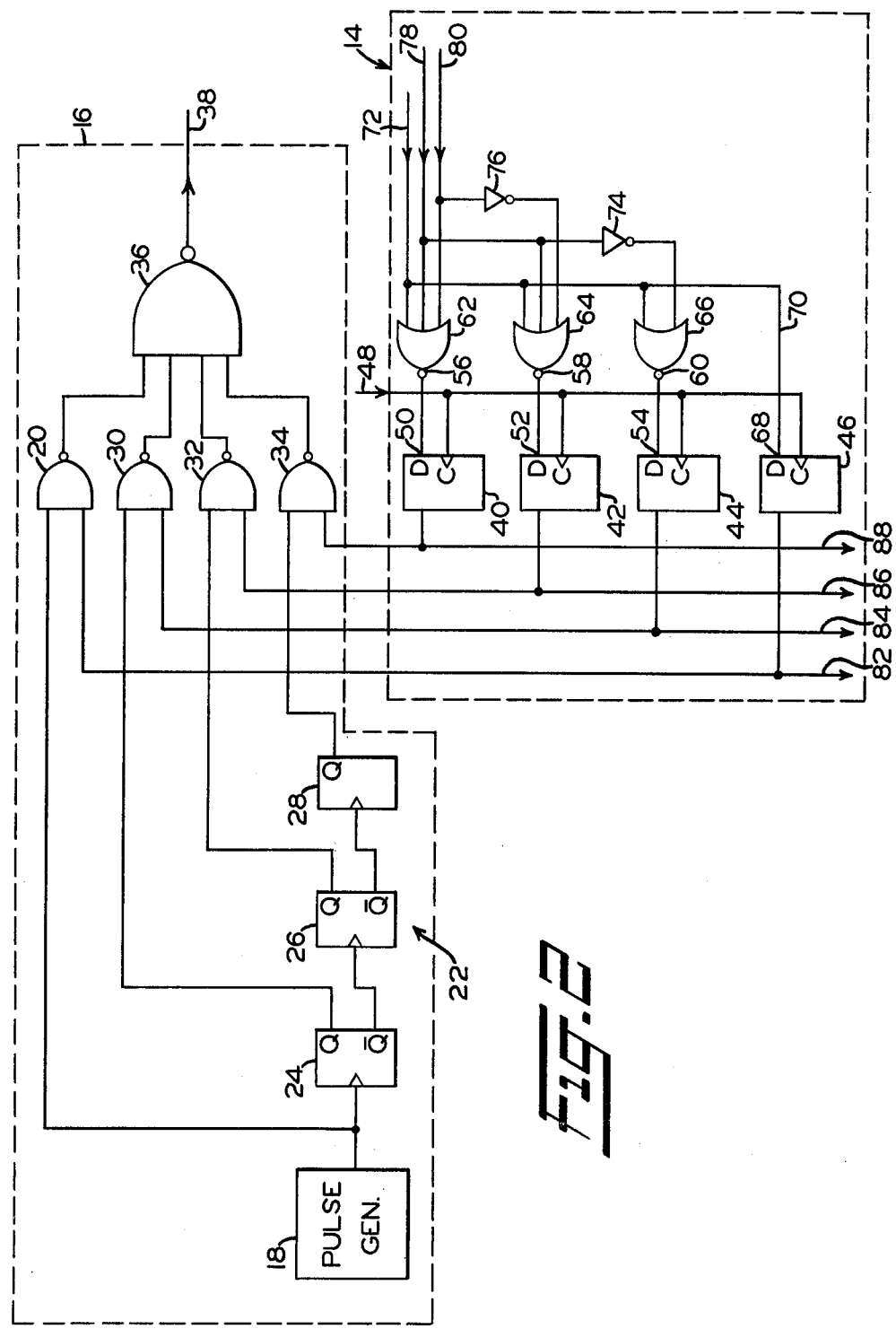
FIG. 2 shows a basic circuit diagram of a cycle duration-measurement system employing a frequency shift arrangement for obtaining the speed ranges, as used in the circuit shown in FIG. 1.

With the aid of FIG. 2, the devices 8 and 10 in FIG. 1 will be further explained with reference to a basic circuit diagram, wherein the reference numeral 14 indicates the circuit for determining the speed range and the numeral 16 indicates the circuit for shifting the measurement or pulse count frequency for measuring the cycle duration. The frequency shifting circuit 16 is provided with a pulse generator 18 whose output is connected with an input of a NAND gate 20 and also with a frequency divider 22, which in this case may be a 3-stage binary frequency divider for subdividing in a stepwise manner, for instance, a pulse frequency $8 f_1$ into the frequencies $4 f_1$, $2 f_1$ and $f_1$. The individual divider stages 24, 26 and 28 are connected to the input terminals of the NAND gates 30, 32 and 34, respectively. The outputs of the NAND gates lead, via a gate 36 and line 38, to a circuit, not shown, for determining the cycle duration. The circuit 14 contains flip-flops associated with individual speed ranges, in this instance flip-flops 40, 42, 44 and 46 associated with four speed ranges. In this case the flip-flops are D flip-flops whose C inputs are connected, via a line 48, to a control device, not shown. The D inputs 50, 52 and 54 of the flip-flops 40, 42 and 44 are connected with the outputs 56, 58 and 60 of the associated NOR gates 62, 64, 66 to establish logical connections, while the D input 68 of the flip-flop 46 is connected, via a line 70, with each of the inputs of the NOR gates and, via a line 72, with a device (not shown) for determining the speed.

As is shown, the other inputs of the NOR gates are interconnected via inverters 74 and 76 and the lines 78 and 80, with the device for determining the speed. As shown, the outputs of the D flip-flops are each connected with the other inputs of the NAND gates in the shifting circuit 16 and furthermore, via the lines 82, 84, 86 and 88, lead back to the device for determining the speed (not shown).

The function of the circuit of FIG. 2 will now be described. Let it be assumed that the whole speed range is divided into four subranges with which four different frequencies, i.e. $f_1$, $2 f_1$, $4 f_1$ and $8 f_1$, are associated, where $f_1$ is to represent the fundamental frequency for which no correction of the measured speed value as determined in the device 4 (FIG. 1) is needed. Before starting the speed measurement, i.e. before starting the pulse count in the device 4 for determining the cycle duration, a control device (not shown) provides, via the line 48, the circuit 14 with a transfer command signal which causes one of the D flip-flops 40–46 to assume a "high" signal state at its connected output. The values corresponding to the speeds measured are transmitted from the device for determining the speed, not shown, to the circuit 14 via the lines 72, 78 and 80. The speed value $2^9$ is assigned to the highest speed range, $2^8$ to the next lower range, etc., via lines 72, 78 and 80 from the device for determining the speed.

If the speed as measured and computed lies within the highest range, $2^9$ is "high", i.e. the line 72 receives a "high" signal which, via the line 70, is applied to the D input 68 of the D flip-flop 46.

If the speed value falls within the second highest range, $2^9$ is "low" and $2^8$ is "high", i.e. a "high" signal is supplied via the line 78. On account of the logical connection of the NOR gate 66 and the inverter 74 there is consequently a "high" signal only on the input 54 of flip-flop 44. In the third highest range ($2^9$ "low", $2^8$ "low", $2^7$ "high") there is accordingly a "high" signal on the D input 52 of the flip-flop 42, on account of the logical connection of the NOR gate 64 and the inverter 76.

In the lowest range (all three lines on "low" signal), there is a high signal only on the D input 50 of the flip-flop 40, on account of the connection of the NOR gate 62.

After the speed range has been determined in this manner, the signal of the respective speed range arrives at one of the NAND gates of the shifting circuit 16, as a result of which the NAND gate associated with the corresponding flip-flop opens. In the highest speed range, for example, the NAND gate 20 is enabled to transmit a frequency via the gate 36 and the line 38 to a device for determining the cycle duration.

At the same time the signal assigned to the respective speed range is led, via one of the lines 82, 84, 86 and 88 — in the above example (the highest speed range) via the line 82 —, back to a device for determining the speed for the purpose of correcting the determined speed value so as to correct accordingly the speed value obtained which, by choosing a counting frequency $2f_1$, $4f_1$ or $8f_1$ other than the fundamental frequency $f_1$, is too small by the factor $\frac{1}{2}$, $\frac{1}{4}$ or $\frac{1}{8}$.

Figure 3:
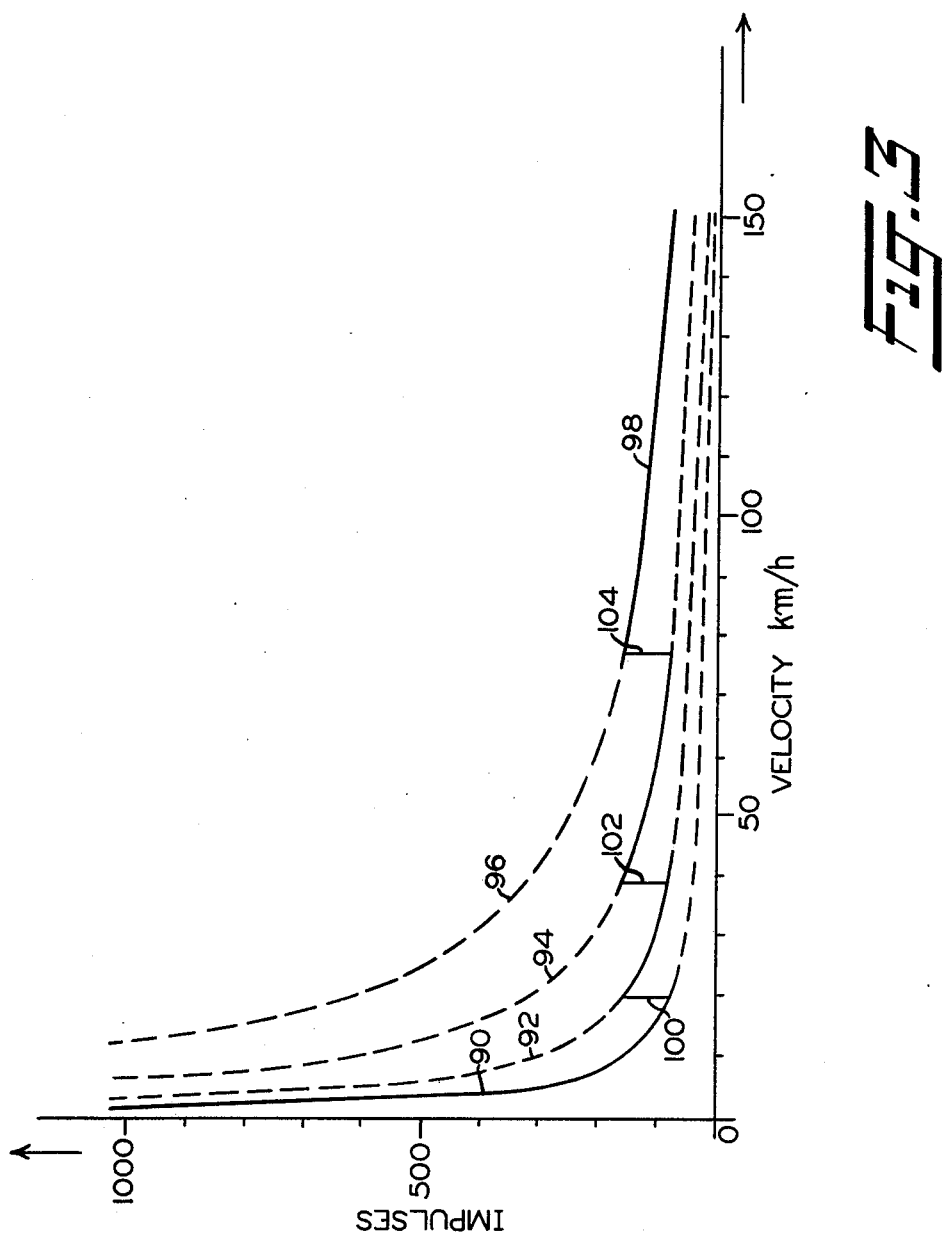
FIG. 3 is a graphical representation showing the dependence of the number of counting pulses upon the speed of a vehicle for four different counting frequencies having the relationship 1:2:4:8, the frequency shifting points being drawn in for a frequency range of 0–150 km/h assumed by way of example.

Reference is not to be made to FIG. 3, wherein four curves 90, 92, 94 and 96 have been drawn which show the relationship between the number of counting pulses and the vehicle speed in a range of 0–150 km/h for four frequencies $f_1$, $2f_1$, $4f_1$ and $8f_1$. For each of these frequencies, a maximum count of, for example, $2^{10} - 1 = 1023$ is assumed. It is quite evident that with the lowest frequency measurement, results are obtained in the lower speed range which can be very well utilized, while it is hardly possible to determine speed changes in the upper speed range due to the low pulse count obtainable. The highest frequency $8f_1$ allows measuring downwards to about 13 km/h only, because beyond this point, counts of over 1023 are obtained and the counter would, so to speak, overrun. The high frequency makes it possible to obtain still useful results in the higher speed range, because in the range of the highest speed of 150 km/h, even in the case of small speed changes, still discernable counting rates are obtained. It is now only necessary to ensure that, when the speed changes, the frequency change takes place at the right moment in order to prevent the counter from overrunning in the case of high frequencies in the lower speed range, or to eliminate too great errors in the case of low frequencies in the upper speed range. When a certain maximum error is assumed, a curve is obtained which is indicated by the extension of the line 98 and wherein the points of abrupt change 100, 102 and 104 are the points of the frequency change.

As is apparent from the example in FIG. 3, the low frequency $f_1$ is used to measure up to about 20 km/h, the frequency $2f_1$ is used to measure from about 20 to 40 km/h, the frequency $4f_1$ is used to measure from about 40 to 75 km/h, and the highest frequency $8f_1$ is used to measure from about 75 to 150 km/h.

Figure 4:
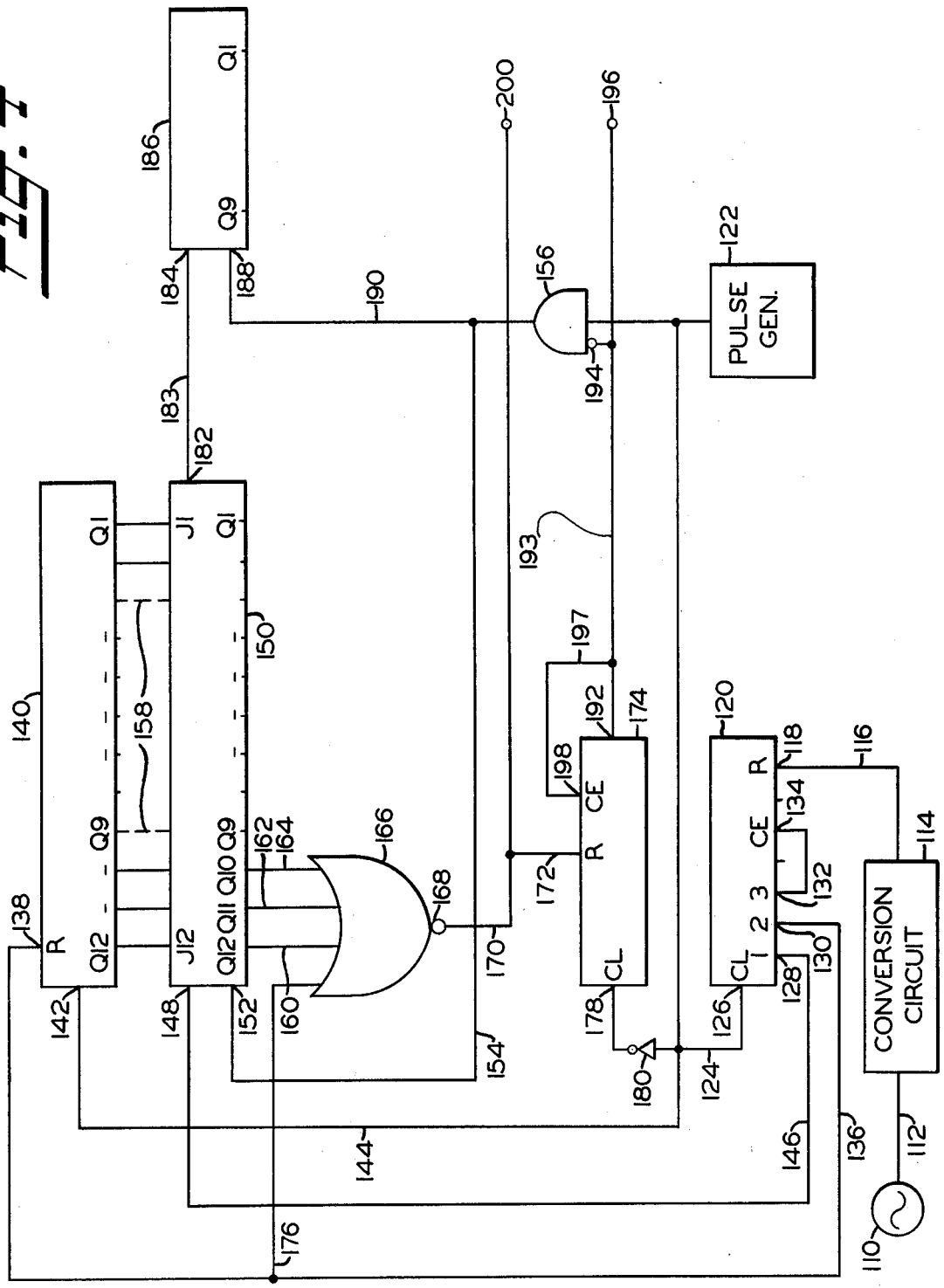

Reference is now to be made to FIG. 4, which shows a block diagram of a second embodiment of the device of the invention. In this embodiment, in contrast with the embodiment according to FIGS. 1 and 2, measurements are carried out with but only one higher frequency, and the counting pulses falling within one sensor signal cycle are counted in a counter according to the higher capacity or number of digits, the counter preferably being a binary counter. Since from the point of view of circuit dimensions the evaluation is to be carried out within a smaller range only, the counting result is to be divided until it lies within the evaluation range. This evaluation range may comprise for instance ten digits and it may be, for instance, predetermined that the highest bit should be at the maximum in the ninth position, which means that the highest number to be processed is, as in the example of FIG. 3 for the first embodiment of the device of the invention, $2^{10} - 1 = 1023$.

The relations and the respective circuit become particularly simple when working — as already indicated hereinbefore — with binary quantities, because it is then possible to employ shift registers for the dividing process. Under these conditions, while expanding on or using the above example, a 12-digit counter, a 12-digit shift register for storing the respective count obtained and a 10-digit shift register for further processing are thus needed.

As in the embodiment of FIG. 1, sensor 110 senses a rotating toothed wheel, not shown, and produces sinusoidal signals which are transmitted via a line 112 to a sine-square wave converter 114. The square wave sensor signals corresponding to the sine wave signals transmitted via a line 116 to a reset input 118 of a control device 120, which in the present example, may be a one-to-three counting counter.

A pulse generator 122 is connected via a line 124 with a count input 126 of the control device 120.

The control device is provided with a first, second and third count output 128, 130 and 132 and CE input (clock-enable input) 134. The second count input 130 is connected via a line 136 with a reset input 138 of a first counter 140, for instance a 12-digit binary counter having outputs $Q_1$–$Q_{12}$ whose count input 142 is connected to pulse generator 122 via a line 144.

The first count output 128 of the control device 120 is connected, via a line 146, with an acceptance input 148 of a first shift register 150, whose shifting pulse input 152 is connected with the pulse generator 122 by way of a line 154 and a gate 156.

The parallel outputs of first counter 140 are connected, via output lines 158, with the first shift register 150 the first several outputs of which, for example the outputs $Q_{12}$, $Q_{11}$ and $Q_{10}$, are connected via lines 160, 162, 164 with an OR gate 166 whose output terminal 168 is connected by a line 170 with a reset input 172 of a second counter 174.

In addition, the second count output 130 is connected with the OR gate 166 via the line 136 and a line 176.

The count input 178 of the second counter 174 is connected with the pulse generator via an inverter 180.

The first shift register 150 has a serial output 182 which is connected, via a line 183, with an input 184 of a second shift register 186, whose shifting pulse input 188 is connected with the pulse generator 122 via a line 190 and the AND gate 156.

The output 192 of the second counter 174 is connected, via a line 193, with an inverting input 194 of AND gate 156 as well as with a terminal 196 and is furthermore connected with the CE terminal 198 via a line 197.

In addition, the output 168 of OR gate 166 is connected with a terminal 200.

The circuit in FIG. 4 functions as follows:

When a high sensor signal is supplied to the reset input 118, the counter 120 is reset for the duration of the high signal. When the following low signal enters, the reset pulse disappears and the counter is set and starts to count the pulses which are supplied by the pulse generator 122 to the count input 126. The first count output 128 is set by the positive edge of the first counting pulse and a control signal is produced which conditions the shift register 150 so as to accept the count obtained from the counter 140. There is a high signal on the output of the gate 166 only when the number transferred exceeds a certain value, here the value $2^{10} - 1$, or when there is a high signal on the count output 130 of the counter 120, which is brought about by the next positive edge of the following pulse supplied by the pulse generator, whereby the output 128 assumes a "low" signal level and the second count output 130 is set to a "high" signal level. Furthermore, when there is a "high" signal on the count output 130, the counter 140 to reset. The output 130 is reset to a "low" signal level by the positive edge of the third counting pulse on the count input 126, as a result of which the reset signal at the counter 140 disappears and the counter 140 begins to count again. At the same time the output 132 is set to a "high" signal level, which is connected with the CE input 134 across which further counting pulses are blocked, thus terminating the counting process in the counter 120. The counter 120 remains, so to speak, fixed at the number 3 until it is reset again by the next high signal supplied by the sine-square wave converter and is set by the following "low" signal so as to start counting again.

Let it now be assumed that the counter 140 provides a count exceeding $2^{10} - 1$ and that there is a "high" signal on the first count output 128 of the counter 120, because at count 3, both the first and third stage flip-flops provide an output to condition shift register 150 for operation. There is then on the output 168 of OR gate 166 a "high" signal, which is on the terminal 200 and resets and holds counter 174 reset via the reset input 172 as long as output 130 is "high". When the count obtained is $\leq 2^{10} - 1$, then the counter 174 would be reset by the next pulse coming from the pulse generator.

On the output 192 of the counter 174, there occurs a "low" signal which is on the terminal 196 and opens the gate 156 via the inverting input 194, so that, via the gate 156, pulses are transmitted to the shift inputs 152 and 188 of the first and second shift registers 150 and 186. As long as there is a "high" signal on any of the outputs $Q_{12}$ to $Q_{10}$, the counter 174 remains reset, and there is a high signal on the terminal 200 and a low signal on the terminal 196. As soon as the highest bit of the number taken from the counter 140 has been shifted to the output $Q_9$ of the shift register 150, there is on the output 168 of the gate 166 a "low" signal which sets the counter 174 by the absence of a reset signal at input 172, so that the counter 174 begins to count, through the inverter 180 the low signals supplied by the pulse generator. During this time, there is now a low signal on the terminal 200, that is, after ending the shifting process is completed. This means that the time during which there is a "high" signal on the terminal 200 and a "low" signal on the terminal 196 is a unit of measure for the shifting or transformation.

After the count present in the shift register 150 has been shifted into the right range $Q_9$ to $Q_1$, 10 more shifting pulses are required to serially load shift register 186 until obtaining the highest bit on the output $Q_9$, so as to evaluate the value produced by the shifting of the count obtained in the counter 140 in the first shift register by dividing with a whole power of two.

For these 10 shifting pulses the output 192 of the counter 174 is also "low". As a result of the connection of the output 192 with the CE input 198, the counting result 10 remains preserved until the next resetting of the counter 174.

When evaluating and further processing the value obtained and stored in the shift register 186, the degree of shifting or transformation must be taken into account. The shifting (transformation) or division of the count, e.g. by $2^n$, as described above, would, with respect to the speed associated with the original count obtained, lead to too high a speed value, which would have to be divided again by the factor $2^n$ in order to obtain the correct speed.

If — as in the present example — a counter 140, preferably a 12-digit binary counter, and a 10-digit evaluation range is chosen, then, taking a speed range of 0–160 km/h as a basis, this would result in 4 speed ranges, viz.: a first range of 160–80 km/h, a second range of 80–40 km/h, a third range of 40–20 km/h and a fourth range of 20–10 km/h. To be able to measure and evaluate longer cycle times down to a speed of for example 5 or 2.5 km/h, it would be sufficient to select a 13 or 14-digit binary counter and shift register.

Reference is now to be made to FIG. 5 which shows another embodiment of the device of the invention.

In an input circuit, not shown, there is produced from the sinusoidal output voltage of a sensor, also not shown, a square wave voltage whose frequency $f$ is the quadruple of the sensor input voltage frequency $f_0$. The high-low times of this square wave voltage thus correspond to the duration of $\frac{1}{8}$ of the cycle duration of the fundamental frequency, i.e. of the sensor signal frequency.

The square wave voltage is transmitted to two series connnected JK flip-flops 210 and 212 between which there is a junction 214 and 215 respectively at which the frequency $f$ is divided down to $\frac{1}{2}f$ and $\frac{1}{4}f$, that is, with respect to the fundamental frequency to $2f_0$ and $f_0$.

Further important components contained in the circuit arrangement of FIG. 5 are, in the present context, a 1/1 counter 216 which counts high-frequency pulses supplied by a pulse generator for the duration of a full sensor signal cycle, a counter in the present context referred to as a 1/n counter 220 which counts the high-frequency pulses of the pulse generator 218 as a function of the counting result of the 1/1 counter 216 for the duration of fractions of the cycle of the sensor signal, as is further explained hereinafter, and also storages 222 and 224 which receive the counts obtained from the counters 216 and 220, as controlled by control units 226 and 228. The adjustment or selection of the partial cycles proceeds via a logical gate circuit 230, 232, as is further explained hereinafter.

Let it be assumed that the maximum count to be processed is preset at $2^{10} - 1$ (1023), which as the upper limit is associated with a certain counting range of various speed range to be evaluated, $2^9 - 1$ to $2^{10} - 1$, is for instance in four speed ranges whose range limits differ from one another by powers of two.

The 1/1 counter 216 and the storage 222 must then be of the 12-digit type to pick up the possible counting results.

The control units 226 and 228 control the transfer of the counts obtained from the counters 216 and 220 into the storages 222 and 224, as has been already described in connection with the embodiments according to FIGS. 1 to 4, so that as far as this aspect is concerned reference may be had to the prior description.

The number stored in the storage 222 is of such a magnitude that the outputs $Q_{10}$ and $Q_{11}$ are "high" and the output $Q_{12}$ is "low", which means that the stored number X is within the range of $4096 = 2^{12} - 1 < X \leq 2^{13} - 1 = 8191$, and there is question of a speed value in the second highest speed range.

In the logical gate circuit 230, which consists of the gates 234, 236 and 238, whose inputs are, in the form as shown, connected with the outputs $Q_{10}$, $Q_{11}$, $Q_{12}$ of the storage 222, the output of the gate 238 is then "high" on account of the inverting input 240 connected with $Q_{12}$ and the non-inverting input 242 connected with $Q_{11}$. The outputs or the gates 234, 236 and 238 of the gate circuit 230 are connected with the inputs of the gates 244, 246 and 248 of the gate circuit 232, respectively.

On the other inputs of these gates 244, 246 and 248, there are the square wave voltages with the frequencies $f_0$, $2f_0$ and $4f_0$.

Since in the example as assumed, the output of the gate 238 is "high", the gate 248 is enabled, as a result of which the output of the gate 248 becomes "high" and the control unit 228 is reset, via a gate 250, for the duration of the "high" time of the undivided square wave signal frequency (4 $f_0$), that is, for the duration of $\frac{1}{8}$ cycle of the sensor signal frequency. This results in the 1/n counter 220 counting the pulses of the pulse generator 218 from a negative edge of the undivided square wave signal frequency to the next negative edge.

If for example the output $Q_{12}$ of the storage 222 is "high", then a gate 252 of the gate circuit 232 is activated directly, there also being on its other input the undivided square wave signal frequency. The resetting rhythm does not change with respect to the control unit 222. Since, however, in addition, the output of the gate 252 is connected directly with the CE input of the counter 220, the "high" signal on this CE input prevents counting during the $\frac{1}{8}$ cycle.

The outputs of the gate circuit 230, as well as the output corresponding to the highest storage position — in this case $Q_{12}$ — of the storage 222, are furthermore connected with an evaluation device, not shown, (see terminals 254) wherein the measured cycle duration or partial cycle duration is corrected according to the degree of transformation which in the chosen examples is $\frac{1}{4}$ ($Q_{10}$ and $Q_{11}$ "high") or $\frac{1}{8}$ ($Q_{12}$ "high").

According to an embodiment of the invention in accordance with the arrangement of FIG. 5, the circuit arrangement can be simplified by dropping the 1/1 counter 216 along with the storage 222 and the control unit 226. The gate circuit 230 then follows the storage 224 and has the function of determining whether the pulses counted or the count Z obtained lies within a range desired, in which case it is advantageous to start each time with the shortest measuring time, i.e. $\frac{1}{8}$ cycle duration.

The range desired is for instance $2^9 \leq Z < 2^{10} - 1$ or 512 1023. If now the count obtained is smaller than $2^9$, then a measuring-time extension of $\frac{1}{4}$ sensor signal cycle duration is brought about by activating the corresponding gate in a manner similar to the exemplified embodiment of FIG. 5.

The measuring time may be extended in a stepwise manner or also as a function of the count obtained.

EXAMPLE

If $2^7$ (128) is not reached, the measuring time is extended by three steps from $\frac{1}{8}$ signal cycle duration to 1/1 signal cycle duration; if $2^8$ (256) is not reached, the measuring time is extended by two steps from $\frac{1}{8}$ signal cycle duration to $\frac{1}{2}$ signal cycle duration, etc.

If the number $2^{10} - 1 = 1023$ is reached or exceeded, the measuring time is shortened accordingly, that is, from 1/1 signal cycle duration to $\frac{1}{2}$ signal cycle duration, respectively.

Having now described the invention, what we claim as new and desire to secure to Letters Patent, is:

1. A digital speed detecting circuit including a sensor device which produces a sequence of sinusoidal signals having a frequency proportional to the speed of a rotating member, a pulse generator having an output frequency greater than the maximum frequency of said sensor signal, and a counter to which the output frequency of said pulse generator is fed to obtain a pulse count representative of the speed of the rotating member during a time interval of a cycle of said sensor signal, wherein the improvement comprises:
   (a) a multi-stage frequency divider network to which said pulse generator is connected for providing a plurality of different frequencies of said pulse generator frequency;
   (b) a frequency selector circuit including:
      (i) a plurality of first NAND gates each having one input subject to the output frequency of a respective stage of said frequency divider network; and
      (ii) a second NAND gate to which the outputs of said plurality of first NAND gates are connected, said second NAND gate having an output via which said output frequency from one of said plurality of said first NAND gates is connected to said counter;
   (c) speed range detector means for enabling said frequency selector circuit so as to choose said output frequency in accordance with a pulse count registered by said counter during the previous cycle of said sensor signal representative of a certain speed range value of said rotating member comprising:
      (i) a plurality of flip-flops, each having an output connected to the other input of a respective one of said plurality of first NAND gates; and
      (ii) a logic network via which signals representing different speed ranges of said rotating member are each connected respectively to a corresponding input of said flip-flops.

2. The circuit as recited in claim 1, wherein said plurality of different frequencies differ from one another by whole powers of 2.

3. The circuit is recited in claim 1, wherein the pulse count resulting, when a different one of said plurality of frequencies is chosen, is corrected in accordance with the chosen frequency, so as to reflect the actual speed of the rotating member following said frequency shift.

4. A digital speed detecting circuit including a sensor device which produces a sequence of sinusoidal signals having a frequency proportional to the speed of a rotating member, a pulse generator having an output frequency greater than the maximum frequency of said sensor signal, and a counter to which the output frequency of said pulse generator is fed to obtain a pulse count representative of the speed of the rotating member during a time interval of a cycle of said sensor signal, wherein the improvement comprises pulse count transformation means for maintaining the pulse count within a fixed evaluation range as a function of different speed ranges of said rotating member, said evaluation range being defined by certain chosen pulse count limits, said pulse count transformation means comprising:
   (a) means for comparing the number of pulses counted during said time interval with said certain pulse count limits; and
   (b) divider circuit means for reducing the pulse count of said counter in a step-wise manner during said time interval of a cycle of said sensor signal so as to lie within said evaluation range when said pulse count exceeds a predetermined value corresponding to the upper count limit of said evaluation range during said time interval of the preceding cycle of said sensor signal, to establish during each cycle thereof a pulse count equal to or less than said predetermined value, comprising:
      (i) a first shift register in which the pulse count of said counter is stored each cycle of said sensor signal, said first shift register having at least as many digital information bits as said counter;

(ii) a gating circuit including an OR gate having each input thereof subject to a respective digital information bit of said first shift register corresponding to a pulse count exceeding said predetermined value; and (iii) control means connected to the output of said OR gate for connecting said pulse generator to said shift register to effect periodic shifting of the digital information bits toward the least significant bit position so long as at least one digital bit is present at said OR gate.

5. The circuit as recited in claim 4, further characterized in that the step-wise reduction of said pulse count takes place in accordance with whole powers of 2.

6. The circuit as recited in claim 4, further comprising a second shift register to which said reduced pulse count stored in said first shift register is transferred following disappearance of an output signal of said OR gate.

7. The circuit as recited in claim 4, further characterized in that the speed of said rotating member as determined in accordance with said reduced pulse count is corrected by a factor corresponding to the time an output signal of said OR gate is present.

* * * * *